United States Patent
Kacines et al.

(10) Patent No.: US 6,752,426 B2
(45) Date of Patent: Jun. 22, 2004

(54) METHOD OF MOUNTING A BRAKE LINE TO A FRAME OR AN ANTI-LOCK BRAKES WIRE

(75) Inventors: Steven C. Kacines, Fort Wayne, IN (US); Chris A. Ciszewski, Fort Wayne, IN (US)

(73) Assignee: CF Gomma USA, Inc., Columbia City, IN (US)

( * ) Notice: Subject to any disclaimer, the term of this patent is extended or adjusted under 35 U.S.C. 154(b) by 79 days.

(21) Appl. No.: 10/114,269

(22) Filed: Apr. 2, 2002

(65) Prior Publication Data

US 2003/0184073 A1 Oct. 2, 2003

(51) Int. Cl.[7] .............................................. B62D 21/17
(52) U.S. Cl. ........................ 280/782; 248/65; 174/72 A
(58) Field of Search ................................. 280/781, 782; 24/339, 555, 546, 545; 248/65, 68.1, 69, 72, 73, 74.1; 174/72 A; 285/242, 256

(56) References Cited

U.S. PATENT DOCUMENTS

| | | | | |
|---|---|---|---|---|
| 3,851,672 A | * | 12/1974 | De Vincent et al. | ........ 138/106 |
| 3,966,520 A | * | 6/1976 | Fallenbeck et al. | ........ 156/73.1 |
| 4,867,400 A | * | 9/1989 | Reindl | ........................ 248/68.1 |
| 4,936,530 A | | 6/1990 | Wollar | ........................... 248/71 |
| 5,319,837 A | | 6/1994 | Kujawski | ........................ 24/16 |
| 5,363,539 A | | 11/1994 | Tisol | ............................ 24/543 |
| 5,425,817 A | * | 6/1995 | Mugge et al. | ............... 138/137 |
| 5,660,513 A | | 8/1997 | Shibanushi | .................. 411/433 |
| 5,703,330 A | | 12/1997 | Kujawski | ....................... 174/72 |
| 5,803,414 A | * | 9/1998 | Wright | ....................... 248/74.4 |
| 6,164,605 A | | 12/2000 | Drake et al. | ................ 248/74.3 |
| 6,450,459 B2 | * | 9/2002 | Nakanishi | ................... 248/68.1 |

FOREIGN PATENT DOCUMENTS

| | | | | |
|---|---|---|---|---|
| DE | 32 38 345 A1 | | 4/1984 | ............. F16L/3/22 |
| GB | 2131118 A | * | 6/1984 | ............. F16L/11/00 |
| GB | 2269201 A | * | 2/1994 | ............. F16L/3/22 |

* cited by examiner

*Primary Examiner*—David R. Dunn
(74) *Attorney, Agent, or Firm*—Taylor & Aust, P.C.

(57) ABSTRACT

A particular automotive assembly includes a brake line, a plastic clip and a second object. The brake line is a polyamide coated tube. The plastic clip has a tube receiver portion and a connector extension extending from the tube receiver portion. The polyamide coated tube is clipped in the tube receiver portion, and the tube receiver portion further is ultrasonically welded to the tube receiver portion. The connector extension facilitates connection of the plastic clip to another member. The second object is operatively attached to the connector extension of the plastic clip, the second object being one of an automotive frame member and an anti-lock brakes (ABS) wire.

15 Claims, 4 Drawing Sheets

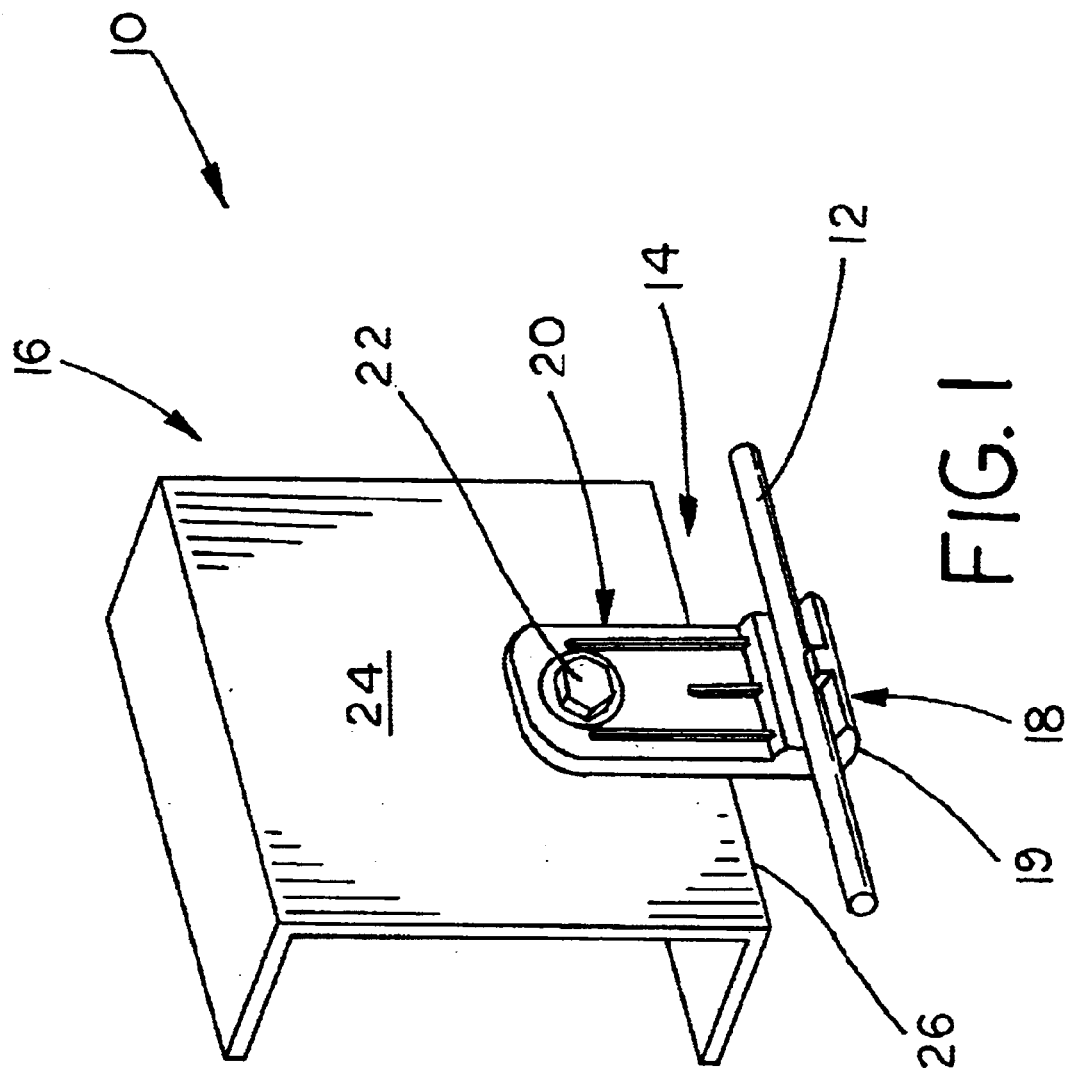

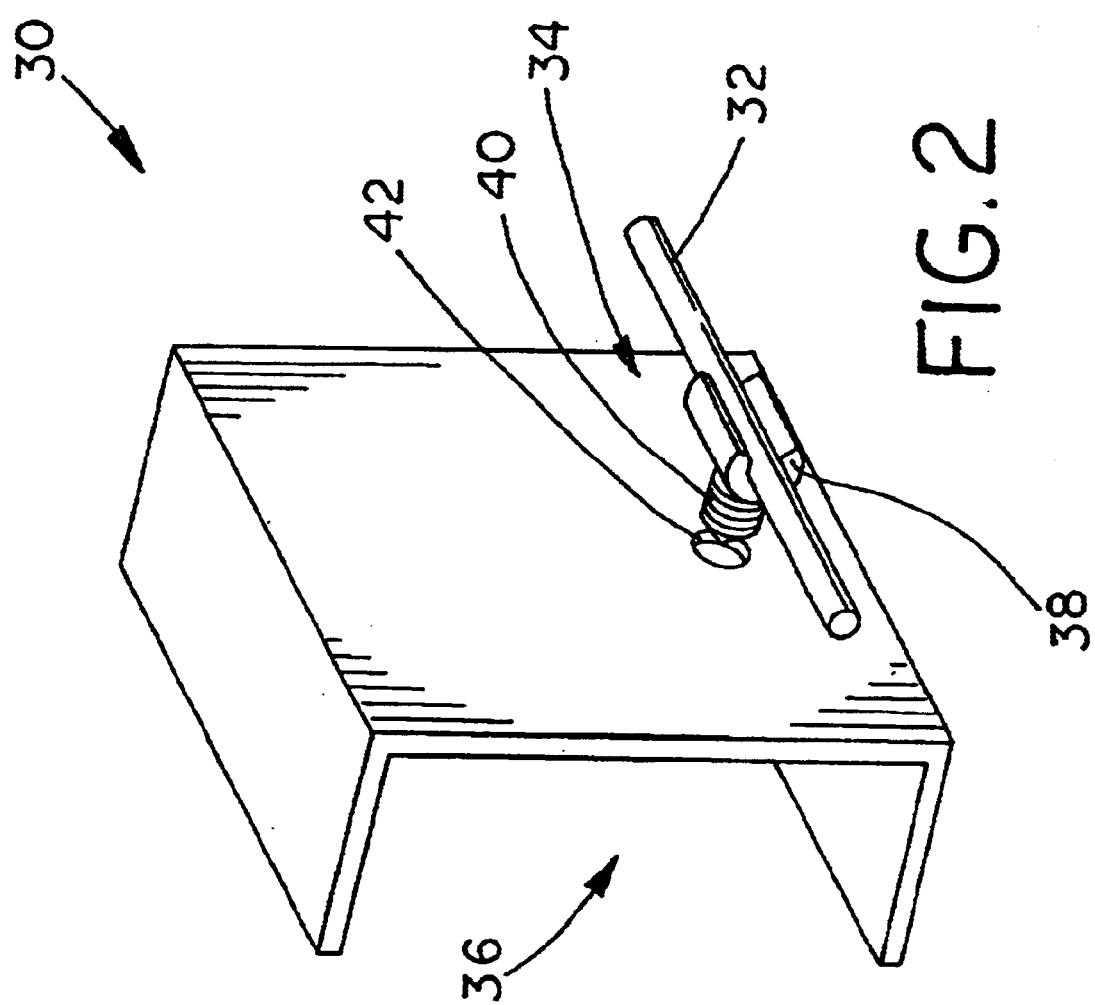

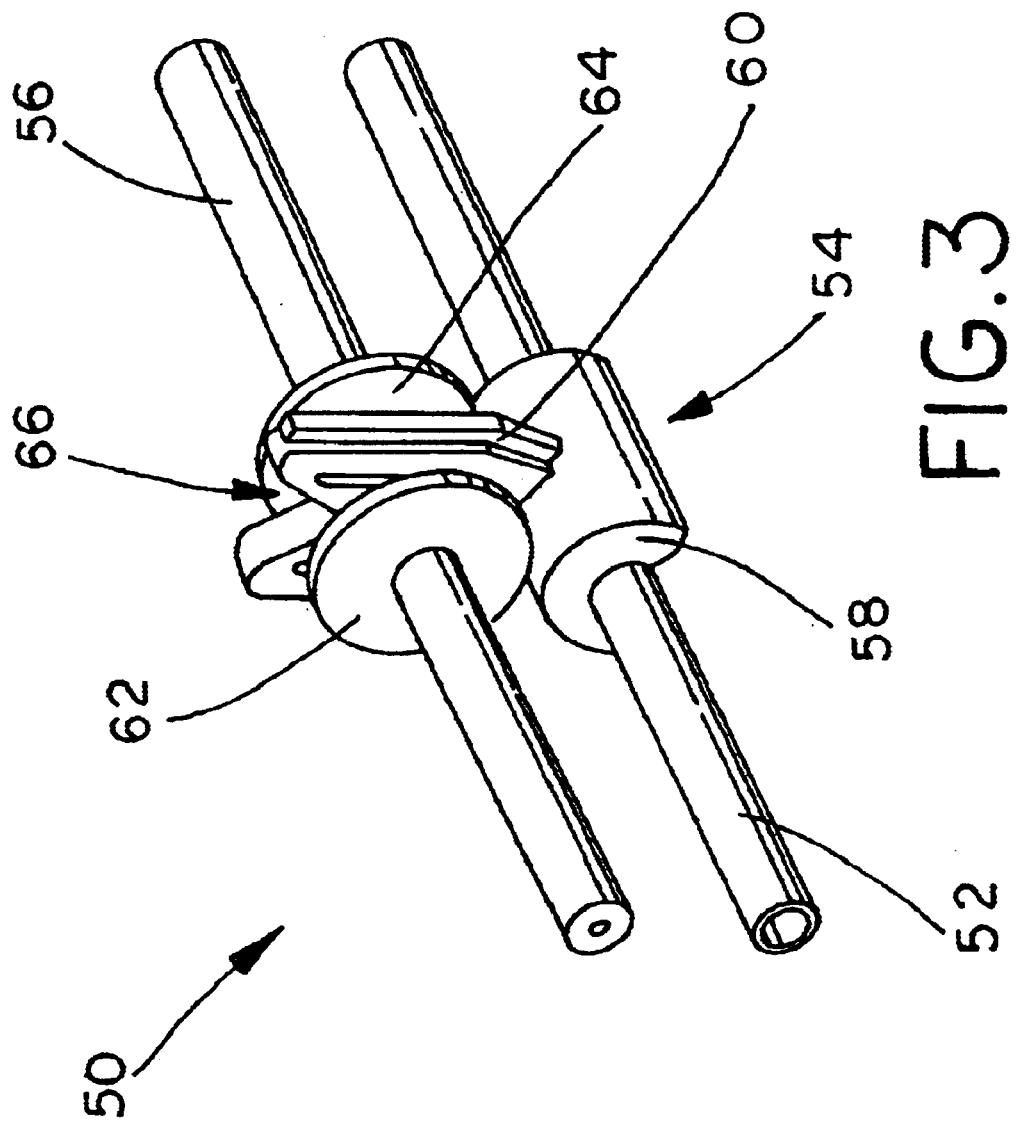

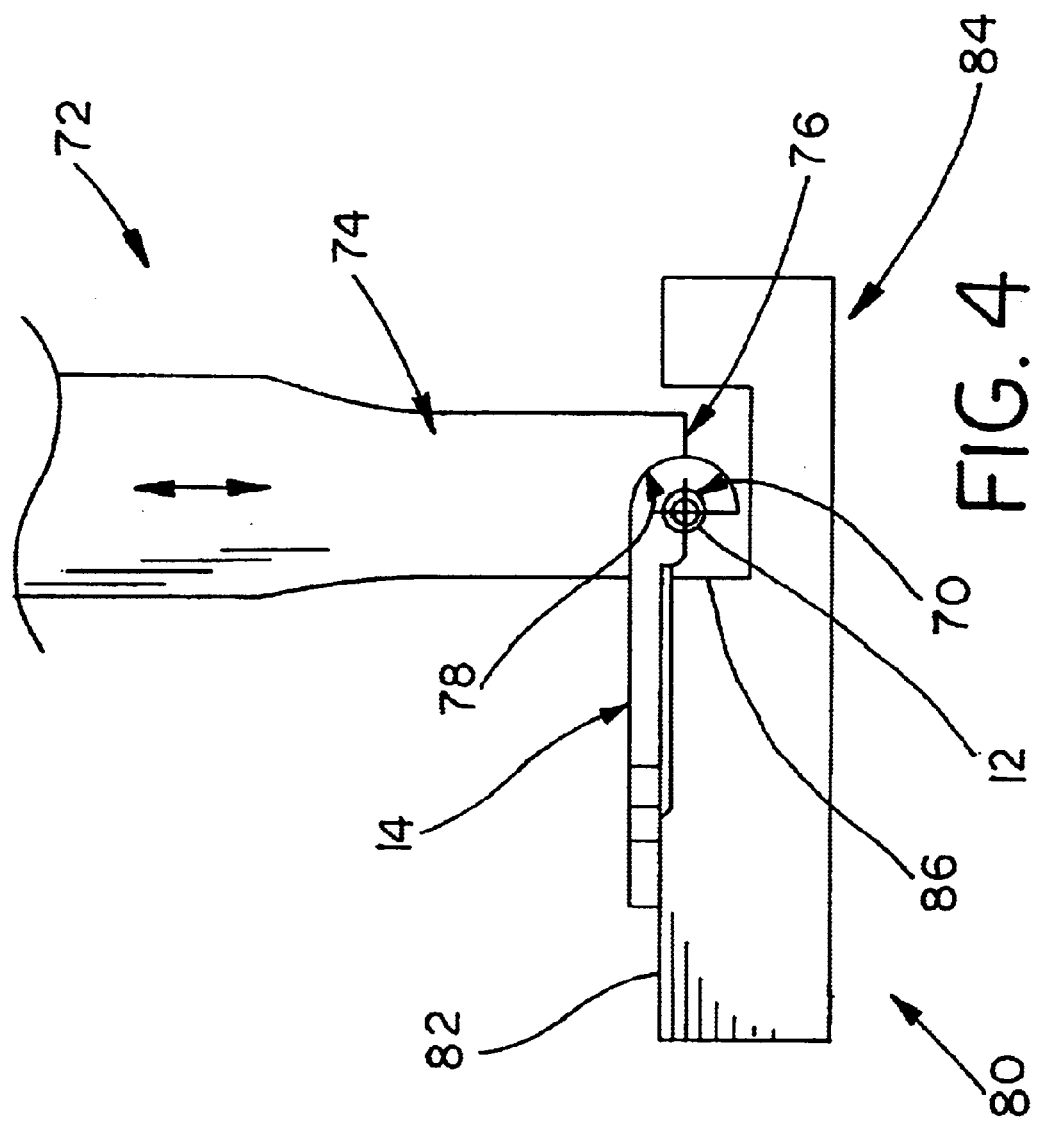

METHOD OF MOUNTING A BRAKE LINE TO A FRAME OR AN ANTI-LOCK BRAKES WIRE

BACKGROUND OF THE INVENTION

1. Field of the Invention

The present invention relates to the mounting of fluid lines in motor vehicles, and, more particularly, to the mounting of a brake line relative to a frame member or an anti-lock brakes (ABS) line.

2. Description of the Related Art

Typical applications of fluid tubing in a motor vehicle requires polyamide coated tubing be affixed to the vehicle in such a manner that the tubing remains in its intended routing within the vehicle. A common method for facilitating this includes snapped-on plastic clips or small metallic brackets that are applied to the part either at the assembly plant or by the manufacturer of the bent tube product.

While this produces a currently accepted method for assembling bent tubing within the vehicle, mounting of such tubing with plastic clips or metal brackets has generally not shown acceptable resistance to rotational and/or longitudinal movement. Under extreme conditions, the fastener or clip can move from the intended design position and cause the tubing to foul or contact other parts of the vehicle. Additionally, if the fastener or clip moves from the preferred location during shipment or fabrication, the assembly plant personnel are thus required to reposition the fastener to allow the component to be mated to the vehicle.

Such mounting arrangements employing plastic clips or metal brackets do not provide a consistently acceptable method for positively locating the attachment hardware, which causes problems cited above. Additionally, since the current art employs a snapped-on clip, it is realized that in production, these clips may fall off during shipment, requiring motor vehicle assembly plant workers to install a new fastener, which slows production and requires the plant to get these items in stock at the line. In the instance of configurations where the metallic or plastic clips hold multiple tubes together, the intended shape of the final product may be compromised due to the inability of current moving arrangements to positively hold the tubes in the preferred location.

Another manifestation of potential rotational and linear movement with respect to the fasteners is in the instance where an item such as an ABS cable is required to mate with the preformed tubing. Current art under this scenario again uses a plastic clip that permits a tube held thereby to move linearly and/or rotationally relative thereto. This movement again causes the components to potentially be installed to the vehicle such that they may contact other components, thus potentially causing a reduction in component life.

What is needed in the art is a method of mounting of a brake line relative to a frame member or an anti-lock brakes (ABS) line which permits the brake line to be initially attached using a simple clip action but yet permit the brake line to be positively located relative to another chosen part.

SUMMARY OF THE INVENTION

The present invention provides a method of mounting a brake line to a plastic clip that employs an additional ultrasonic welding step after clipping those parts together in order to positively locate the brake line relative to the plastic clip both prior to and after mounting of the clip to a further member, such as an automotive frame member or an anti-lock brakes (ABS) wire.

The invention comprises, in one form thereof, a particular automotive assembly that includes a brake line, a plastic clip and a second object. The brake line is a polyamide coated tube. The plastic clip has a tube receiver portion and a connector extension extending from the tube receiver portion. The polyamide coated tube is clipped in the tube receiver portion, and the tube receiver portion further is ultrasonically welded to the tube receiver portion. The connector extension facilitates connection of the plastic clip to another member. The second object is operatively attached to the connector extension of the plastic clip, the second object being one of an automotive frame member and an ABS wire.

The invention comprises, in another form thereof, a method of positively locating a polyamide coated tube relative to a plastic clip, the plastic clip having a tube receiver portion. The method includes the step of clipping the polyamide coated tube in the tube receiver portion, thereby defining a tube/clip contact zone. An ultrasonic bonding device including an ultrasonic horn is provided. The ultrasonic horn is positioned against one of the polyamide coated tube and the plastic clip proximate the tube/clip contact zone and is used to ultrasonically weld the polyamide coated tube and the plastic clip together.

An advantage of the present invention is that fluid tubing mounted in the manner of the invention is resistant to both rotational and longitudinal (i.e., linear) movement.

Another advantage is that such mounting ensures positive routing or design position of applied components.

Yet another advantage is that, due to the durability of this type of mounting, tubing positioned in such a fashion is resistant to movement (including vibrational movement) through the life of the vehicle.

An even further advantage is that tubing mounted in accordance with the invention is tends to remain intact and in alignment during shipment to assembly plants.

An even yet further advantage is that such a mounting reduces assembly plant labor by including provisions for attachment to the vehicle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a perspective view of one embodiment of an automotive assembly of the present invention, particularly one in which a brake line is mounted relative to an automotive frame member;

FIG. 2 is a perspective view of a second embodiment of an automotive assembly of the present invention, particularly one in which a brake line is mounted relative to an automotive frame member;

FIG. 3 is a perspective view of a third embodiment of an automotive assembly of the present invention, particularly one in which a brake line is mounted relative to an anti-lock brakes (ABS) wire or line; and FIG. 4 is a side view of the ultrasonic welding step used in forming the automotive assembly of FIG. 1.

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DETAILED DESCRIPTION OF THE INVENTION

Referring now to the drawings, and more particularly to FIG. 1, there is shown a first embodiment of an automotive assembly 10 which generally includes a brake line 12, a plastic clip 14 and an automotive frame member 16.

Brake line 12 is a polyamide coated tube and is configured for carrying brake fluid (not shown) therein. A polyamide material that can be used for this purpose, by way of example only, is nylon.

Plastic clip 14, due to the general nature of its shape, may also be called a plastic p-clip. Plastic clip 14 has a tube receiver portion 18 and a connector extension 20 extending from tube receiver portion 18. Tube receiver portion 18 and connector extension 20 together form the generally p-shaped structure of plastic clip 14. Brake line 12 is clipped in tube receiver portion 18, and tube receiver portion 18 further is ultrasonically welded to brake line 12. Connector extension 20 facilitates connection of plastic clip 14 to automotive frame member 16.

Automotive frame member 16 is operatively attached to connector extension 20 of plastic clip 14. Advantageously, a threaded fastener such as bolt 22 is used to make such an attachment. Automotive frame member 16 has a frame surface 24 and a frame edge 26. Connector extension 20 lies parallel to and against frame surface 24 when attached to automotive frame member 16. When attached as such, connector extension 20 extends beyond frame edge 26 and thereby holds tube receiver portion 18 and, thus, brake line 12 a distance away from automotive frame member 16.

With respect to the second embodiment illustrated in FIG. 2, automotive assembly 30 generally includes a brake line 32, a plastic clip 34 and an automotive frame member 36.

Brake line 32 is a polyamide coated tube and is configured for carrying brake fluid (not shown) therein. A polyamide material that can be used for this purpose, by way of example only, is nylon.

Plastic clip 34 has a tube receiver portion 38 and a connector extension 40 extending from tube receiver portion 38. Brake line 32 is clipped in tube receiver portion 38, and tube receiver portion 38 further is ultrasonically welded to brake line 32. Connector extension 40 facilitates connection of plastic clip 34 to automotive frame member 36. In this embodiment, connector extension 40 is itself a threaded fastener.

Automotive frame member 36 is operatively attached to connector extension 40 of plastic clip 34. Specifically, automotive frame member is provided with a frame bore 42 therein, and connector extension 40, being threaded, extends at least enough of the way into frame bore 42 (i.e., full extension of connector extension 40 through frame bore 42 may not be necessary to achieve a sufficiently connection) to thereby establish an operative connection between plastic clip 34 and automotive frame member 36.

FIG. 3 illustrates yet a third embodiment of the present invention. Automotive assembly 50 generally includes a brake line 52, a plastic clip 54 and an anti-lock brakes (ABS) wire or line 56.

Brake line 52 is a polyamide coated tube and is configured for carrying brake fluid (not shown) therein. A polyamide material that can be used for this purpose, by way of example only, is nylon.

Plastic clip 54 has a tube receiver portion 58 and a connector extension 60 extending from tube receiver portion 58. Brake line 52 is clipped in tube receiver portion 58, and tube receiver portion 58 further is ultrasonically welded to brake line 52. Connector extension 60 facilitates connection of plastic clip 54 to ABS wire 56. In this embodiment, connector extension 60 is itself a snap clip member.

ABS wire 56 is attached to plastic clip 54 by snapping connector extension 60, being a snap clip member, over ABS wire 56. ABS wire 56 further has a first grommet 62 and a second grommet 64 attached thereupon. First grommet 62 and second grommet 64 are spaced apart from one another so as to form a snap clip member receiving gap 66 therebetween. Connector extension 60 is inserted into snap clip member receiving gap 66 and snapped over ABS wire 56. First grommet 62 and second grommet 64 limit lateral movement of connector extension 60 relative to ABS wire 56.

In assembling brake line 12 with plastic clip 14, as illustrated in FIG. 4, brake line 12 is clipped in tube receiver portion 18, thereby defining a tube/clip contact zone 70. An ultrasonic bonding device 72 including an ultrasonic horn 74 is provided. Ultrasonic horn 74 is positioned against one of brake line 12 and plastic clip 14 proximate tube/clip contact zone 70 and is used to ultrasonically weld brake line 12 and plastic clip 14 together.

Ultrasonic horn 74 has a longitudinal horn direction 76, ultrasonic horn 74 vibrating in longitudinal horn direction 76 during the ultrasonic welding step. Ultrasonic bonding device 72 is computer (not shown) controlled so as to apply approximately 1500 watts of energy to ultrasonic horn 74 in the embodiment illustrated. However, it is understood that other power outputs, either higher or lower, may generated as the situation warrants. Plastic clip 14 has an outer clip portion 19 opposed to tube receiver portion 18, and ultrasonic horn 74 has an operative horn end 76. Operative horn end 76 is one of machined and formed so to have a horn end profile 78, horn end profile 78 matingly fitting with outer clip portion 19.

In the assembly process illustrated in FIG. 4, a weld fixture 80 having a fixture surface 82 and a fixture end 84 is also provided. Weld fixture 80 further includes a fixture recess 86 in fixture surface 82 proximate fixture end 84. After clipping brake line 12 in plastic clip 14, plastic clip 14 is placed on fixture surface 82 such that tube/clip contact zone 70 is located within fixture recess 86, weld fixture 80 thereby helping to stabilize automotive assembly 10 during the ultrasonic welding step.

Although the assembly process was illustrated in FIG. 4 with respect to the first embodiment, it is to be understood that this process generally extends to the embodiments of FIGS. 2 and 3 as well as other possible embodiments, taking into account the possible need for changes in geometry of ultrasonic horn 74 and weld fixture 80 to accommodate different layout requirements and taking into account the possible need for somewhat different bonding parameters (e.g., bonding power and time).

Alternatively, while not shown per se, plastic clip 14, 34 could be used to mount various other fluid lines (e.g., window washing fluid, transmission fluid, fuel, coolant and/or air conditioning lines) relative to automotive frame 16, 36 in the manner described as long as polyamide coated tubes are employed for such fluid lines also.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An automotive assembly, comprising:
    a brake line comprising a polyamide coated tube;
    a plastic clip having a tube receiver portion and a connector extension extending from said tube receiver portion, said polyamide coated tube being clipped in said tube receiver portion, said polyamide coated tube further being ultrasonically welded to said tube receiver portion, said connector extension facilitating connection of said plastic clip to another member;
    a second object operatively attached to said connector extension of said plastic clip, said second object being one of an automotive frame member and an anti-lock brakes wire; and
    at least one grommet disposed on one of said brake line and said anti-lock brake wire proximate to said plastic clip.

2. The automotive assembly of claim 1, wherein said second object is said automotive frame member, said plastic clip being a plastic p-clip, said tube receiver portion and said connector extension of said plastic p-clip together forming a generally p-shaped structure.

3. The automotive assembly of claim 2, wherein said automotive frame member has a frame surface and a frame edge, said connector extension lying parallel to and against said frame surface, said connector extension being attached to said frame surface via a threaded connector, said connector extension extending beyond said frame edge and thereby holding said tube receiver portion and said brake line a distance away from said automotive frame member.

4. The automotive assembly of claim 1, wherein said second object is said automotive frame member, said connector extension being a threaded member, said automotive frame member having a bore therein, said threaded member extending at least into said bore and thereby operatively connecting said plastic clip to said automotive frame member.

5. The automotive assembly of claim 1, wherein said second object is said anti-lock brakes wire, said connector extension being a snap clip member, said snap clip member being snapped over said anti-lock brakes wire to thereby attach said plastic clip to said anti-lock brakes wire.

6. An automotive assembly, comprising:
    a brake line comprising a polyamide coated tube;
    a plastic clip having a tube receiver portion and a connector extension extending from said tube receiver portion, said polyamide coated tube being clipped in said tube receiver portion, said polyamide coated tube further being ultrasonically welded to said tube receiver portion, said connector extension facilitating connection of said plastic clip to another member; and
    a second object operatively attached to said connector extension of said plastic clip, said second object being an anti-lock brakes wire, said connector extension being a snap clip member, said anti-lock brakes wire further having a first grommet and a second grommet attached thereupon, said first grommet and said second grommet being spaced apart from one another so as to form a snap clip member receiving gap therebetween, said snap clip member being inserted into said snap clip member receiving gap and snapped over said anti-lock brakes wire, said first grommet and said second grommet limiting lateral movement of said snap clip member relative to said anti-lock brakes wire.

7. A method of positively locating a polyamide coated tube relative to a plastic clip, said plastic clip having a tube receiver portion, the method comprising the steps of:
    clipping said polyamide coated tube in said tube receiver portion, thereby defining a tube/clip contact zone;
    providing an ultrasonic bonding device, said ultrasonic bonding device including an ultrasonic horn;
    positioning said ultrasonic horn against one of said polyamide coated tube and said plastic clip proximate said tube/clip contact zone;
    ultrasonically welding said polyamide coated tube and said plastic clip together using said ultrasonic horn; and
    mounting a second object to said plastic clip at a distance from said tube receiver portion, said second object being one of a frame member and an anti-lock brake wire, said polyimide coated tube being a brake line; and
    placing at least one grommet on one of said brake line and said anti-lock brake wire proximate to said tube receiving portion.

8. The method of claim 7, wherein said ultrasonic horn has a longitudinal horn direction, said ultrasonic horn vibrating in said longitudinal horn direction during said ultrasonic welding step.

9. The method of claim 7, wherein said ultrasonic welding device is computer controlled so as to apply approximately 1500 watts of energy to said ultrasonic horn.

10. The method of claim 7, wherein said ultrasonic horn is positioned against said plastic clip, said plastic clip having an outer clip portion opposed to said tube receiver portion, said ultrasonic horn having an operative horn end, said operative horn end being one of machined and formed so to have a horn end profile, said horn end profile matingly fitting with said outer clip portion.

11. The method of claim 7, further comprising the steps of:
    providing a weld fixture having a fixture surface and a fixture end, said weld fixture further including a fixture recess in said fixture surface proximate said fixture end; and
    after said clipping step, placing said plastic clip on said fixture surface such that said tube/clip contact zone is located within said fixture recess.

12. The method of claim 7, wherein said plastic clip has a first clip end and a second clip end, said tube receiver portion being located at least proximate said first clip end, said method further comprising a step of mounting a second object to said plastic clip proximate said second clip end.

13. The method of claim 12, wherein said polyamide coated tube is a brake line, said second object being one of a frame member and an anti-lock brakes wire.

14. The method of claim 7, further comprising a step of mounting said plastic clip to a frame member, said polyamide coated tube being a fluid line.

15. A method of positively locating a polyamide coated tube relative to a plastic clip, said plastic clip having a tube receiver portion, the method comprising the steps of:
    clipping said polyamide coated tube in said tube receiver portion, thereby defining a tube/clip contact zone;
    providing an ultrasonic bonding device, said ultrasonic bonding device including an ultrasonic horn;

positioning said ultrasonic horn against one of said polyamide coated tube and said plastic clip proximate said tube/clip contact zone;

ultrasonically welding said polyamide coated tube and said plastic clip together using said ultrasonic horn;

mounting a second object to said plastic clip at a distance from said a tube receiver portion, said polyamide coated tube being a brake line, said second object being an anti-lock brakes wire, said plastic clip further including a snap clip member, said anti-lock brakes wire further having a first grommet and a second grommet attached thereupon, said first grommet and said second grommet being spaced apart from one another so as to form a snap clip member receiving gap therebetween, said step of mounting said second object to said plastic clip including the substeps of:

inserting said snap clip member into said snap clip member receiving gap, said first grommet and said second grommet limiting lateral movement of said snap clip member relative to said anti-lock brakes wire upon insertion thereof into said snap clip member receiving gap; and snapping said snap clip member over said anti-lock brakes wire to thereby attach said plastic clip to said anti-lock brakes wire.

\* \* \* \* \*